May 6, 1969
J. G. MOORHEAD
3,443,225
ELECTROSTATIC INTEGRATOR
Original Filed April 16, 1963
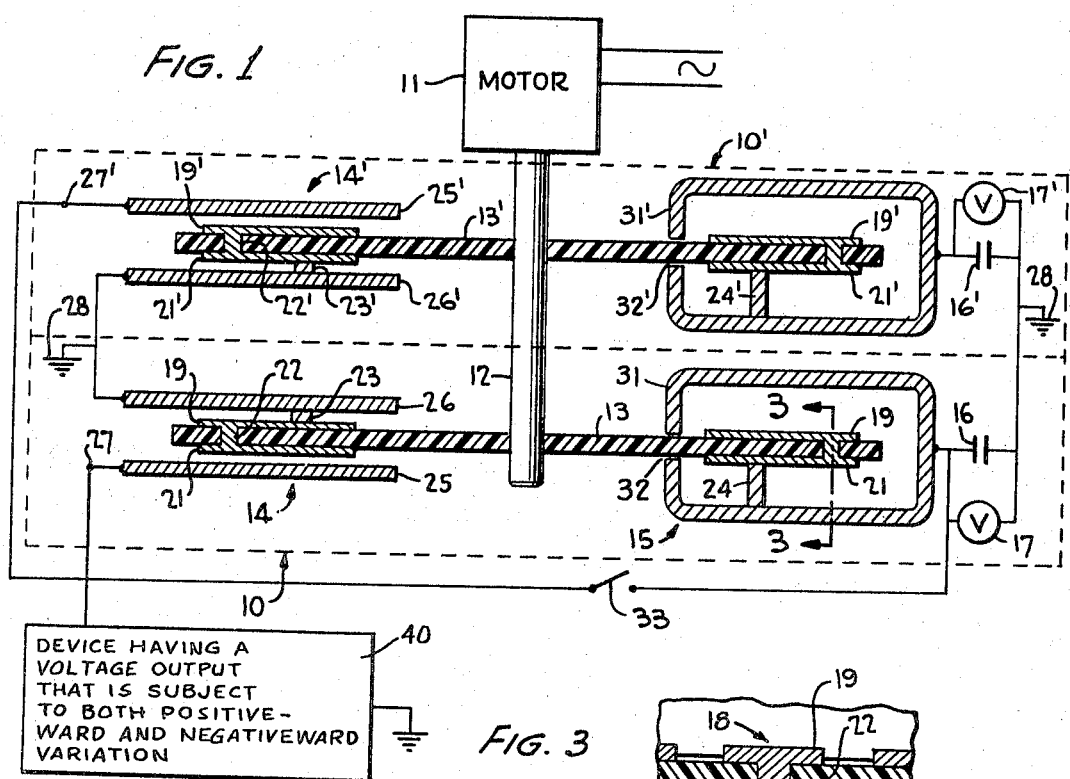
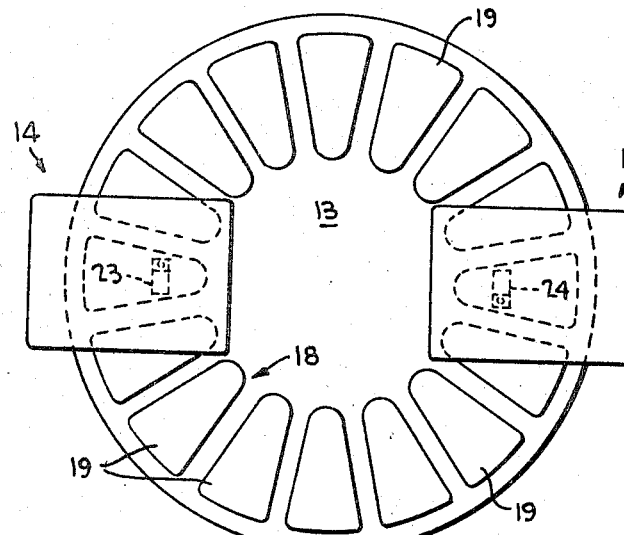
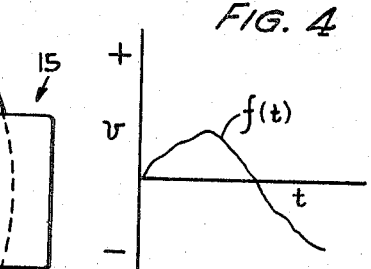
JOHN G. MOORHEAD,
INVENTOR.

United States Patent Office 3,443,225
Patented May 6, 1969

3,443,225
ELECTROSTATIC INTEGRATOR
John G. Moorhead, Silver Spring, Md., assignor to the United States of America as represented by the Secretary of the Army
Continuation of application Ser. No. 273,536, Apr. 16, 1963. This application Jan. 5, 1967, Ser. No. 607,584
Int. Cl. G01r 19/16
U.S. Cl. 324—76  2 Claims

ABSTRACT OF THE DISCLOSURE

A varying signal is applied to a pair of plates and is sampled by a plurality of conductive charge carriers, insulated mounted near the circumference of a rotating disc. Charges picked up by the carriers as they move between the plates are accumulated in a capacitor by means of a contacting element that brushes against the carriers. During the time that each carrier is in contact with the contacting element the element-and-carrier combination are substantially surrounded by a conductive shell that is electrically connected to the contacting element. The voltage across the capacitor is the integral of the varying signal.

---

This application is a continuation of application Ser. No. 273,536, dated Apr. 16, 1963.

The invention described herein may be manufactured and used by or for the Government of the United States of America for governmental purposes without the payment to me of any royalty thereon.

This invention relates to integrators and more particularly to an integrator which integrates a function which is presented as an electrical potential.

An object of this invention is to provide an electro-mechanical integrating unit which continuously gives an output voltage proportional to the value of the integral of an input voltage. For example, the sensitivity of instruments commonly involved in the detection and measurement of the emissions associated with nuclear transformations is such that the statistical nature of the physical processes becomes very apparent. As a result of the relatively small number of particles or quanta which are detected, it is impossible to state the intensity of the emission at any particular instant, but only the average intensity over a time interval. The precision of such measurements increases with time interval and also with the intensity. To obtain the intensity of an emission as a function of time it is necessary to introduce an integrating device to provide an output proportional to the time average of the number of events which are detected.

Another object of the invention is to provide an electro-mechanical integrator which is capable of integrating an input function over an indefinite period of time, and which can perform the integration irrespective of the slope or sign of the input voltage. Many functions which are represented by a voltage contain both positive and negative values. Many prior art devices have found it necessary to perform the integration in such cases in two separate steps. By the practice of this invention, the integration can be performed continuously.

A further object of the present invention is to provide an electro-mechanical integrating device which is readily adaptable to perform a double integration. In an altimeter, for example, when a potential proportional to the vertical component of acceleration of an inertial mass is applied to this instrument as an input potential, the first integral is proportional to the velocity and the second integral is proportional to the change in altitude.

A still further object of this invention is to provide an integrator of high accuracy which is simple and inexpensive.

An additional object of the present invention is to provide an electro-mechanical integrating device which offers a very high input impedance, and which is capable of integrating functions represented by voltages of small magnitude.

In its most general aspects the device of this invention is capable of integrating the expression $f(x)dx$. Normally, the integral will be a time integral and the expression will be $f(t)dt$. The function of time, $f(t)$ to be integrated is applied as a potential $V_1$ to the electrostatic integrator of this invention. The electrostatic integrator has a measuring or sampling means which includes inducing plate means and a plurality of discrete sampling segments. These sampling segments have induced in them a charge proportional to the voltage $V_1$ which is applied to the inducing plate means. These incremental charges, representive of the instantaneous value of the function $V_1$, are then transferred to the inside of a substantially enclosed collector. The incremental charges collected by the collector are transferred to a capacitive storage means, and the voltage developed across the capacitor is a function of the charge stored therein.

The specific nature of the invention, as well as other objects, uses and advantages thereof, will clearly appear from the following description and from the accompanying drawings, in which:

FIG. 1 is a partial section view of a double integrating device embodying the principles of this invention.

FIG. 2 is a plan view of a transfer disc comprising part of the device of FIGURE 1.

FIG. 3 is a sectional view taken along the line 3—3 of FIG. 1.

FIG. 4 is a representative function which may be integrated.

In FIGURE 1 the double integrating device shown comprises a first integrator 10 and a second integrator 10'. These two integrators are essentially identical. "Prime" (') superscripts are used to identify the elements of second integrator 10' that correspond to like elements of first integrator 10. Both integrators are driven by a single motor 11 having a shaft 12 on which are mounted transfer discs 13 and 13' of integrators 10 and 10' respectively. The applicability to integrator 10' of the following description of the operation of integrator 10 will be readily apparent.

Integrator 10 comprises an input terminal 27, an electrostatic sampling device 14, a collecting device 15, a charge transfer unit carrier consisting of a rotating disc 13 for transferring increments of charge from device 14 to device 15, a capacitor 16 for storing the increments of charge collected by device 15, and a voltmeter 17 for reading the voltage across capacitor 17. A device 40 having a voltage output that is subject to both positiveward and negativeward variation has its output connected to input terminal 27.

Rotating disc 13 is of insulating material and carries a plurality of charge-transfer units 18 distributed circumferentially about disc 13. Each charge-transfer unit 18 consists of an upper segment 19 on the upper surface of disc 13, a lower segment 21 on the lower surface of disc 13, and a conductive element 22 passing through disc 13 and electrically connecting segments 19 and 21 to each other.

Sampling device 14 comprises a first inducing plate 25 connected to input terminal 27; a second inducing plate 26 connected to circuit ground 28; and a conductive contacting element 23. Plates 25 and 26 are parallel to each other and to disc 13, are generally similar to each other in size and shape, are somewhat more extensive in area than the segments 19 and 21, and are mounted substantially opposed to each other but spaced apart sufficiently to permit passage of disc 13 therebetween. Contacting element 23 is mounted to provide electrical contact between grounded plate 26 and segment 19.

Collecting device 15 is mounted at a different angular position from sampling device 14 with respect to shaft 12 and disk 13. Collecting device 15 comprises a substantially completely enclosed conducting shell member 31 having an opening 32 to allow disc 13, with transfer units 18, to rotate through shell 31. A second conductive contacting element 24, generally similar to element 23, is mounted to provide electrical contact between shell 31 and one of the segments. Shell 31 is connected to one side of an integrating capacitor 16 the other side of which is connected to ground 28. A suitable voltmeter 17 is connected across capacitor 17 to measure the voltage thereacross.

The operation of the integrating device of this invention may now be explained. The performance of the single integration will be explained first, double integration being an integration of the output of the first integrator. During this single integration, a switch 33, connected between shell 31 and input terminal 27' of integrator 10', may be assumed to be open.

Assume a voltage $V=f(t)$, which represents the function pictured in FIG. 4, to be applied to terminal 27 at time equal to 0. Motor 11 causes disc 13 to rotate continuously at a uniform rate. The speed of rotation of disc 13, and the size and spacing of the transfer units 18, will determine the accuracy of the integration. A pair of charge transfer segments 19 and 21 will be rotated between the inducing plates 25 and 26 with the contactor 23 contacting segment 19. With a positive voltage applied at 27, the plate 25 is positive and this plate induces a negative charge on the surface of the segment 21 nearest the plate 25 by means of electrostatic induction. Since the segment 21 is connected to the segment 19 by means of a conductor 22, segment 19 tends to become positively charged as conduction electrons attracted by the plate 25 move to the surface of segment 21. Segment 19 is connected by means of contact member 23 to induction plate 26 which in turn is connected to ground 28. Electrons flow from ground 28 through plate 26 to segment 19 in order to neutralize the positive charge on segment 19. While the segments 19 and 21 are still between the inducing plates 25 and 26, as can be seen in FIG. 2, the contact between contacting member 23 and segment 19 is broken. In this manner the segments 19 and 21 become negatively charged an amount $Q=K_1V_1$ where $K_1$ is a constant depending upon the configuration, such as the spacing between the inducing plates 25, 26 and the transfer segments 19 and 21, and also the size of the transfer segments. The voltage $V_1$ is the mean value of the function $f(t)$ during the time the segment 19 is in contact with contacting means 23. This process is repeated as each successive transfer unit 18 comes in contact with contacting means 23. As the magnitude of the voltage on lead 27 increases, the amount of charge accumulated by transfer segments 19 and 21 increases, and conversely, if the voltage decreases the amount of charge decreases. When the function $f(t)$ becomes negative, as is shown in FIG. 4, the sign of the charge stored on transfer units 18 also changes, because a negative voltage on inducing plate 25 induces a positive charge, by electrostatic induction, on the surface of transfer segment 21 causing transfer segment 19 to become negatively charged. This negative charge is conducted by means of contacting member 23 and plate 26 to ground 28, and when the contact is broken the transfer unit 18 retains a net positive charge.

Since the transfer units 18 are insulated from the surroundings, the charge accumulated on transfer units 18 is not dissipated and is transferred as the disc 13 rotates to collector 15. As was previously mentioned, collector 15 is comprised of a substantially continuous, closed shell 31 insulated from its surroundings. As each of the transfer units 18 comes in contact with the contacting element 24, which is inside of the shell 31, the charge stored on the unit is conducted by contacting element 24 to the conducting shell 31 where it is stored on the outer surface. Care should be taken that there are no sharp edges on the shell 31 where charge may tend to leak off. As is well known, the charge will be stored on the outer surface of the shell 31. This charge stored on the surface of the shell produces no charge on the inner surface no matter how great the charge on the outer surface may be. Since there is no charge on the inner surface, due to the charge on the outer surface, there are no electric lines of force in the cavity of the shell 31 produced by the charge stored on the outer surface. For this reason, as in the Van de Graaff generator, charge is always transferred from units 18 to the collector 15 irrespective of the magnitude of the charge stored on the shell 31, or the sign of the charge stored on the collector 31 relative to the sign of the charge on the transfer units 18. The charge transferred to the collector 15 is stored in the capacitor 16. The voltage $V_2$ across the capacitor 16, which may be measured by a meter 17, is related to the charge by the well known equation $V_2=Q/C_2$, where $C_2$ is the capacitance of the capacitor 16. The voltage V across the capacitor 16 can also be represented approximately, in terms of the input to lead 27, as $$V_2 = \frac{K_2}{C_2}\int_0^t f(t)dt$$

where $K_2$ depends upon the dimensions of the parts and the speed of the motor.

As long as the function being integrated $f(t)$ remains positive, even though the slope of the function varies, each increment of charge transferred will add to the total charge on the capacitor 16. The rate of addition, however, will depend on the magnitude of the function in the region being integrated. When the function crosses zero and becomes negative, the sign of the charge induced on the transfer unit 18 will change. This charge, when transferred to the collector 15, will have the effect of neutralizing a part of the charge stored in the capacitor 17, thereby decreasing the total charge stored and lowering the voltage across the capacitor. In this manner, functions having both positive and negative values may be integrated in a single continuous operation.

To perform a double integration, as for example, where it is desired to obtain the position of a moving body and the input voltage represents acceleration, the switch 33 may be closed and the voltage appearing across the capacitor 16 is used as an input to the second integrating unit 10'. With the collector 15 of integrator 10 connected to the inductor unit 14' of integrator 10' the potential $V_3$ developed across the capacitor 16' equals $Q_3/C_3$, and can be represented approximately as:

$$V_3 = K_3/C_3 \int_0^t V_2(t)dt$$

or in terms of the input on 27 as:

$$V_3 = K_3/C_3 \int_0^t \int_0^t f(t)dt^2$$

The constant $K_3$ represents the entire system constant and depends principally upon the geometry, and motor speed, and $C_3$ is the value of capacitor 16'. The first and second integrals above approximate closely the true values on the assumption of no leakage of charge. Leakage, of course, introduces an error into the integration, but this error is, in many applications, negligible.

I claim as my invention:

1. An electrostatic integrating device for producing a voltage that is the integral of a voltage that is subject to both positiveward and negativeward variation, comprising:
 (a) an input terminal,
 (b) a charge transfer unit carrier of insulating material,
 (c) a plurality of electrically conductive charge transfer units electrically insulated from each other and mounted equidistant from each other along a continuous path on said charge transfer unit carrier, (d) means for applying uniform motion to said charge transfer unit carrier so that said charge transfer units are moved at a uniform rate along said continuous path, (e) an electrostatic sampling device positioned in a first region along said path, said sampling device having first and second spaced conductive plates insulated from each other and positioned so that said charge transfer units are moved through the space between said plates in response to motion of said carrier, said sampling device also having a conductive contacting element conductively mounted on said first plate and adapted to make conductive contact with each of said units as said unit moves through said space, said first plate being connected to circuit ground and said second plate being connected to said input terminal, (f) an electrostatic collecting device positioned in a second region along said path, said collecting device comprising a substantially closed shell of conductive material and a second conductive contacting element, said shell having an aperture, said shell and aperture being of such size and shape, and being so positioned, that said charge transfer units are carried through the interior of said shell in response to the motion of said carrier, said second conductive contacting element being conductively mounted on the interior of said shell and positioned to make conductive contact with a portion of each charge transfer unit passing therethrough, and (g) an integrating capacitor connected between said shell and circuit ground, (h) whereby when said assemblies are moved through said sampling device they acquire charges proportional to the voltage at said input terminal during the sampling period and the charge on each of said assemblies is subsequently transferred to said capacitor so that the voltage across said capacitor is substantially the integral of the voltage at said input terminal.

2. The device of claim 1 further including means to measure the voltage across said capacitor.

References Cited

UNITED STATES PATENTS

| | | | |
|---|---|---|---|
| 2,610,994 | 9/1952 | Bosch et al. | 307—109 X |
| 3,070,972 | 2/1937 | Lindenblad | 310—5 |
| 3,001,713 | 9/1961 | McGonegle | 235—183 |

RUDOLPH V. ROLINEC, *Primary Examiner.*

A. E. SMITH, *Assistant Examiner.*

U.S. Cl. X.R.

235—183; 307—109; 310—6